United States Patent [19]

Gross et al.

[11] Patent Number: 4,987,586
[45] Date of Patent: Jan. 22, 1991

[54] MODEM-TELEPHONE INTERCONNECT

[75] Inventors: Allen E. Gross, Carrollton; Marvin F. Malm, Dallas, both of Tex.

[73] Assignee: Compaq Computer Corporation, Houston, Tex.

[21] Appl. No.: 80,404

[22] Filed: Jul. 31, 1987

[51] Int. Cl.$^5$ .................... H04M 11/00; H04M 1/68
[52] U.S. Cl. ........................... 379/93; 379/98; 379/102; 379/184
[58] Field of Search ............ 379/93, 96, 97, 98, 379/106, 107, 100, 102, 184

[56] References Cited

U.S. PATENT DOCUMENTS

| | | | |
|---|---|---|---|
| 3,517,137 | 6/1970 | Ribner | 379/93 |
| 3,524,023 | 8/1970 | Whang | 179/2 |
| 3,746,794 | 7/1973 | Stifle et al. | 179/2 DP |
| 3,842,207 | 10/1974 | Fretwell | 179/2 DP |
| 3,943,285 | 3/1976 | Ragsdale et al. | 178/67 |
| 3,979,676 | 9/1976 | Poma | 325/38 B |
| 4,009,342 | 2/1977 | Fahrenschon et al. | 379/93 |
| 4,035,625 | 7/1977 | Chiu et al. | 235/152 |
| 4,052,558 | 10/1977 | Patterson | 178/68 |
| 4,149,030 | 4/1979 | Foreman | 178/59 |
| 4,302,629 | 11/1981 | Foulkes et al. | 179/2 DP |
| 4,306,116 | 12/1981 | McClure et al. | 379/98 |
| 4,321,429 | 3/1982 | Takatsuki et al. | 379/98 |
| 4,330,687 | 5/1982 | Foulkes et al. | 179/2 DP |
| 4,350,848 | 9/1982 | Kariya et al. | 379/105 |
| 4,355,397 | 10/1982 | Stuart | 375/17 |
| 4,367,374 | 1/1983 | Serrano | 379/442 |
| 4,394,540 | 7/1983 | Willis et al. | 379/107 |
| 4,425,625 | 1/1984 | Seligman et al. | 364/900 |
| 4,463,351 | 7/1984 | Chiarottino | 340/825.5 |
| 4,471,489 | 9/1984 | Konetski et al. | 375/5 |
| 4,496,943 | 1/1985 | Greenblatt | 340/711 |
| 4,503,288 | 3/1985 | Kessler | 179/2 DP |
| 4,514,825 | 4/1985 | Nordling | 364/900 |
| 4,524,244 | 6/1985 | Faggin et al. | 179/2 DP |
| 4,546,212 | 8/1985 | Crowder, Sr. | 179/2 C |
| 4,571,456 | 2/1986 | Paulsen et al. | 179/2 C |
| 4,578,537 | 3/1986 | Faggin et al. | 179/2 DP |
| 4,580,266 | 4/1986 | Kletzkine et al. | 371/57 |
| 4,585,904 | 4/1986 | Mincone et al. | 179/7.1 TP |
| 4,596,021 | 6/1986 | Carter et al. | 379/98 |
| 4,660,218 | 4/1987 | Hashimoto | 379/93 |
| 4,807,278 | 2/1989 | Ross | 379/93 |
| 4,809,317 | 2/1989 | Howe et al. | 379/98 |

FOREIGN PATENT DOCUMENTS

| | | | |
|---|---|---|---|
| 0014774 | 9/1980 | European Pat. Off. | 379/107 |
| 0076854 | 5/1985 | Japan | 379/96 |
| 0023268 | 1/1987 | Japan | 379/102 |
| 0029265 | 2/1987 | Japan | 379/100 |
| WO85/03609 | 8/1985 | PCT Int'l Appl. | |

OTHER PUBLICATIONS

K. D. Witt, "Switch Box for Voice/Data Communication", IBM Technical Disclosure Bulletin, vol. 14, No. 5, Oct. 1971, pp. 1606–1607.

*Primary Examiner*—Jin F. Ng
*Assistant Examiner*—Wing F. Chan
*Attorney, Agent, or Firm*—Compaq Computer Corp.

[57] ABSTRACT

A modem/telephone interconnect for sharing a telephone line or communication channel between a modem and a telephone or other communication device. The interconnect provides access to the telephone line by both devices but normally prevents each device from interrupting or interfering with the operation of the other. The telephone can be used to monitor data transfer by the modem without the possibility of interfering with the data signals or quiet times.

7 Claims, 4 Drawing Sheets

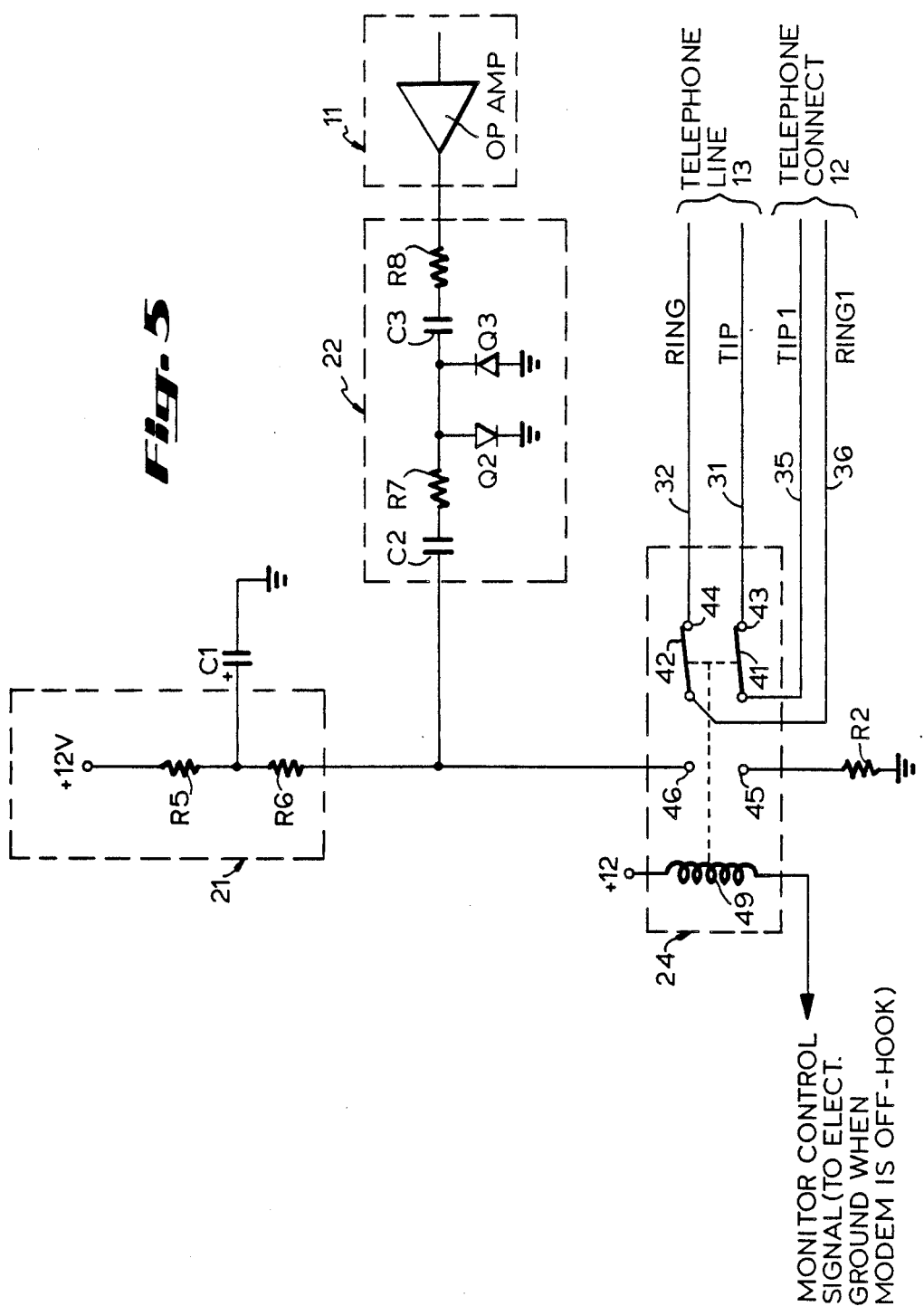

MODEM-TELEPHONE INTERCONNECT

FIELD OF THE INVENTION

The present invention concerns the interconnections between a telephone and a modem with a telephone line. Specifically, the invention coordinates access to the telephone line by the telephone and the modem in such a manner that neither the telephone nor the modem will normally interrupt operation by the other. However, either one can interrupt the other should conditions requiring the interruption occur.

BACKGROUND OF THE INVENTION

Devices known as modems (MOdulator-DEModulators) have been used for many years to connect computer terminals and other such devices to ordinary telephone lines. Modems were developed so that digital information could be easily transmitted from one location to another distant location via the telephone line. The telephone line is capable of supporting analog signals generally in the audible frequency range and the modem is a means for modulating those signals using the digital information, coupling the modulated "carrier" to the telephone line, and demodulating signals received from other locations to recover digital information. Modems are well known in the art.

In the past, two methods were normally used to transmit data via telephone lines using modems. First, a telephone line might be dedicated to the transmission of data and would have a modem connected at each of its ends. No other signals, e.g., telephone voice signals, would be transmitted by this "dedicated" line. Second, a telephone line might be used to transmit data signals and voice signals and this might be done alternately or simultaneously. A modem and a ordinary telephone would be connected at each end of the line and would have access to the line. The dedicated line approach is more costly and, in some instances, is not practical, for example, where the number of telephone lines available is low. Therefore, the shared line is preferred in many cases.

One arrangement for sharing a telephone line between a telephone and a modem is shown in U.S. Pat. Nos. 4,524,244 and 4,578,537, both to Faggin, et al. Those patents contain virtually the same disclosure and show a digital and voice telecommunication device. A cross-point matrix comprises a combination of switches which connect the telephone line with telephone equipment and, alternatively, to a modem for data transmission and reception. In a first position, the matrix connects the telephone to the line to provide normal audio communications and connects the modem to the line to detect incoming signals. In a second position, the matrix disconnects the telephone from the line and connects the modem to allow transmission and reception of data signals. The matrix is under the control of a telephone control and computer and is normally in its first position. When it is desired to transmit data via the modem and the telephone line, an operator signals the computer and the computer switches the matrix from its first position to its second position, disconnecting the telephone from the line and providing connections for data transfer. If, while the matrix is in its first position, a carrier signal is detected on the telephone line (indicating that data is to be received by the modem), the computer automatically switches the matrix to its second position. When data transfer is complete, the computer automatically returns the matrix to its first position. In the system shown by Faggin, an incoming carrier signal will cause the computer to interrupt an ongoing voice communication on the telephone and, if an operator instructs the computer to transmit data, the computer will, likewise, interrupt any voice communications.

U.S. Pat. Nos. 4,302,629 and 4,330,687 to Foulkes, et al., show use of a non-loaded telephone line for simultaneous transmission of digital data and base band telephone signals. The telephone is connected to the "tip" and "ring" telephone wires through an audio or voice frequency filter which prevents the transmitted and received digital data signals from reaching the telephone and prevents spurious high frequency signals generated by the telephone from reaching the non-loaded loops. The modem includes a transmitter and receiver which transmits and receives pairs of frequency-shift keyed (FSK) signals. The FSK signals are chosen to lie outside the normal range of voice or audio frequencies and thus will not be passed by the audio filter to the phone. Thus, data transmission by means of the modem and voice communications by means of the telephone can occur simultaneously along the telephone line. Because of the filtering, the telephone cannot be used to monitor the transmission and reception of data by the modem.

SUMMARY OF THE INVENTION

The present invention allows the shared use of a single telephone line, or communication channel, by a telephone and a modem, wherein the operation of either device is not normally interrupted by the other. One embodiment of the invention resides in an interface which interconnects the telephone and the modem with the telephone line. The interface coordinates the use of the shared line by the telephone and the modem.

The modem and the telephone are both normally connected to the telephone line and each can detect incoming signals. If the telephone goes off-hook in response to an incoming ringing signal or if the telephone is already off-hook, a telephone off-hook signal indicating such condition prevents the modem from going off-hook until the phone is once again in the on-hook condition. When the modem is in an off-condition, a modem off-hook signal causes the telephone to be disconnected from the line and connected to a monitor line. The telephone can then be used to monitor data transfer by the modem but the telephone does not interfere with the data transmission.

A preferred embodiment of the present invention resides in an interface including a switch normally connecting the telephone to the telephone line, a telephone off-hook detection circuit, and a monitor circuit for receiving data signals from the modem. The switch is operative to receive a modem off-hook signal when the modem is in an off-hook condition and responds by disconnecting the telephone from the telephone line and connecting the telephone to the monitor circuit. The detection circuit senses an off-hook condition at the telephone and responds to that condition by preventing the modem from assuming an off-hook condition. The interface allows both the telephone and the modem to have access to the telephone line but prevents interruption of the operation of either device by the other. Also, the telephone may be used to monitor data transmission and reception without interfering with the data transfer operation.

BRIEF DESCRIPTION OF THE DRAWINGS

FIG. 5 is a schematic diagram of the monitor circuit of the interface of FIG. 2.

DETAILED DESCRIPTION OF A PREFERRED EMBODIMENT

Figure 1:
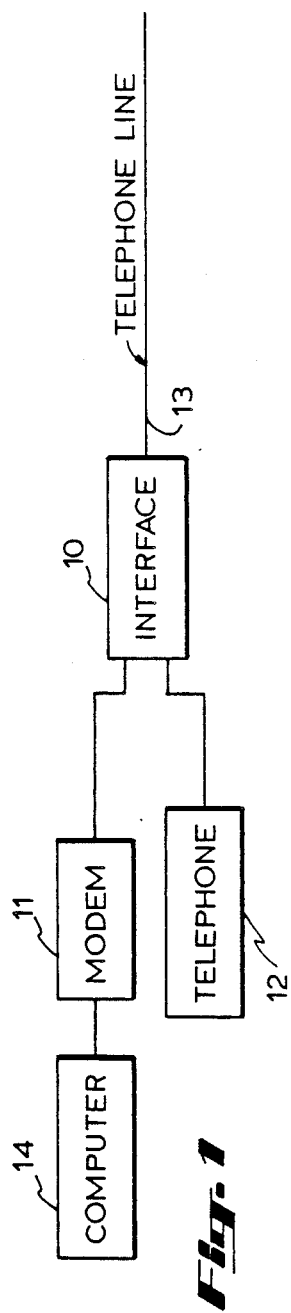
FIG. 1 is a block diagram showing a telephone line which is shared by a telephone and a modem.

FIG. 1 shows an arrangement in which the present invention may be employed with advantage. An interface device 10 is disposed between a modem 11 and telephone 12 and a telephone line, or communication channel, 13. The modem 11 will typically interconnect a computer 14, or similar device, with the telephone line 13 through the interface 10. The operation of the modem 11 may vary in its specifics but will generally receive digital signals from the computer 14 and modulate a carrier signal for transmission along the telephone line 13. The modem 11 can also receive modulated carrier signals from the telephone line 13 and demodulate those signals to recover digital information for sending to the computer 14.

Figure 2:
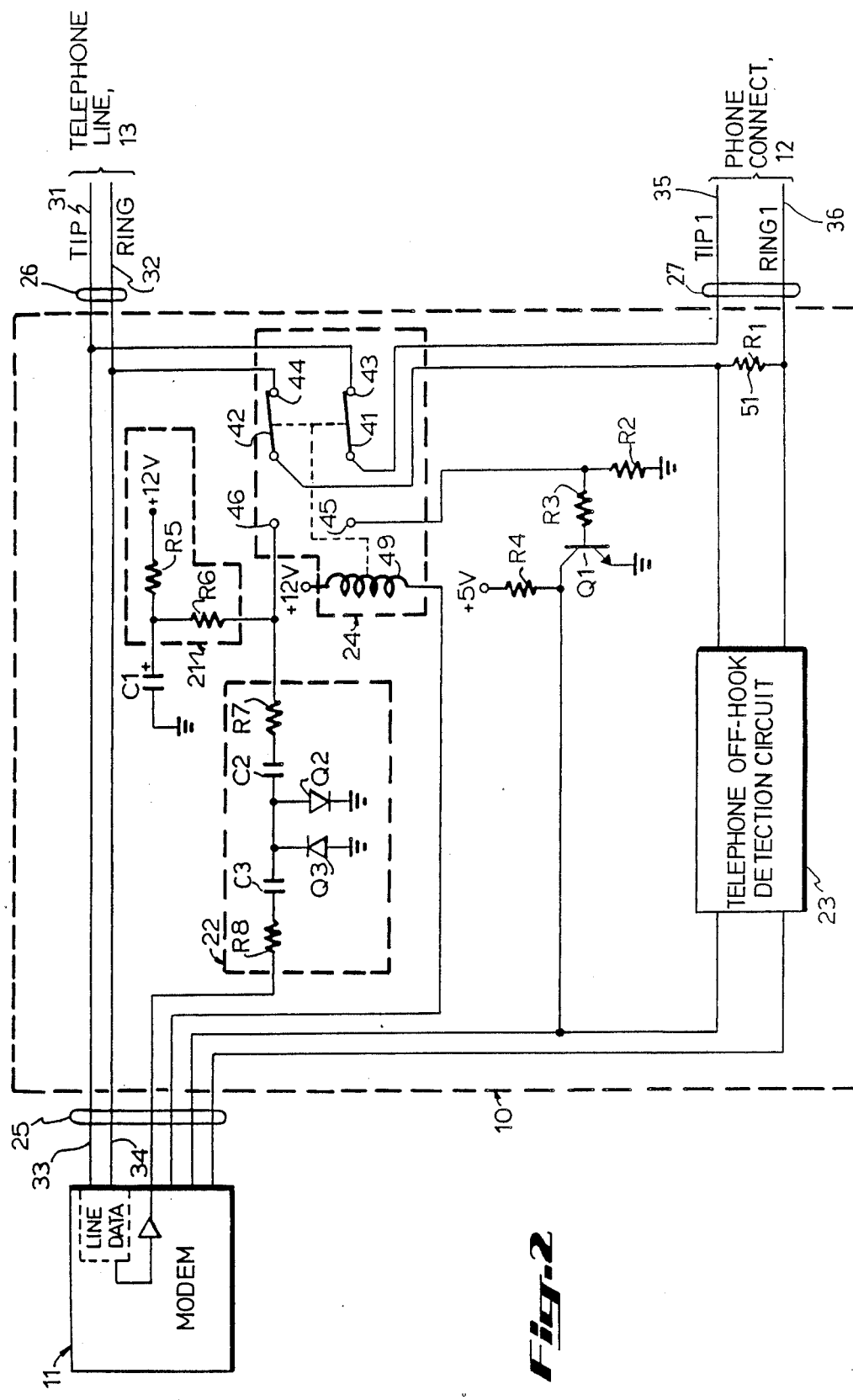
FIG. 2 is a schematic diagram of an interface according to the present invention and shows the connections between the interface and the telephone line, the telephone and the modem.

A preferred embodiment of the present invention takes the form of an interface 10 which is schematically illustrated in FIG. 2. The interface 10 includes a line current generator 21, a D.C. isolation and protection circuit 22, a telephone off-hook detection circuit 23, a switch 24, and ports, or points of connection, 25, 26 and 27 for connecting the interface 10 to the telephone line 13, the modem 11 and the telephone 12, respectively. Although lamps, indicators or other devices may be added to the modem 11, telephone 12 or interface 10 circuitry, such devices are well understood and are not needed for the practice of the present invention. Accordingly, they are not shown in FIG. 2 and will not be discussed.

Referring to FIG. 2, the telephone line 13 typically includes TIP and RING lines, 31 and 32, respectively, which support the analog signals transmitted by the line 13. The TIP and RING lines 31 and 32 of the telephone line 13 are electrically connected to the interface 10 at the port 26. The port 25 interconnects several signals between the modem 11 and the interface 10, among them being modem TIP and RING connections, 33 and 34, respectively. Internal to the interface 10, the TIP and RING lines 31 and 32 of the telephone line 13 are connected directly to the TIP and RING lines 33 and 34 of the modem 11. This interconnection need not be direct and would not be direct under conditions which will be discussed below.

The telephone port 27 provides connection for TIP and RING lines, 35 and 36 respectively, of the telephone 12 to the interface 10. The telephone TIP and RING lines 35 and 36 are electrically connected to the poles 41 and 42 of switch 24. The switch 24 is a double-pole, double-throw (DPDT) solenoid-actuated switch, or relay. The solenoid 49, when energized, switches the poles 41 and 42 from their first, normally closed position wherein they contact points 43 and 44 of the switch 24 to their second, normally open position wherein they contact points 45 and 46 of the switch 24. The points 43 and 44 of the switch 24 are connected to the TIP and RING lines 31 and 32 of the telephone line 13 at the port 26 and, thus, a continuous electrical path is provided between the telephone line 13 and the telephone 12 when the switch solenoid 49 is de-energized and the switch 24 is in its first, normally closed position.

Connected in electrical series with the RING lines 32 and 36 is a telephone off-hook detection circuit 23. The detection of an off-hook condition at the telephone 12 may be accomplished using "polled" or "non-polled" detection. "Polled" detection requires an inquiry by the modem 11, at which time the telephone 12 will be checked for the off-hook condition. "Non-polled" detection gives a direct indication of the telephone off-hook condition when it occurs, without inquiry by the modem 11. Either method may be used with equally satisfactory results.

Figure 3:
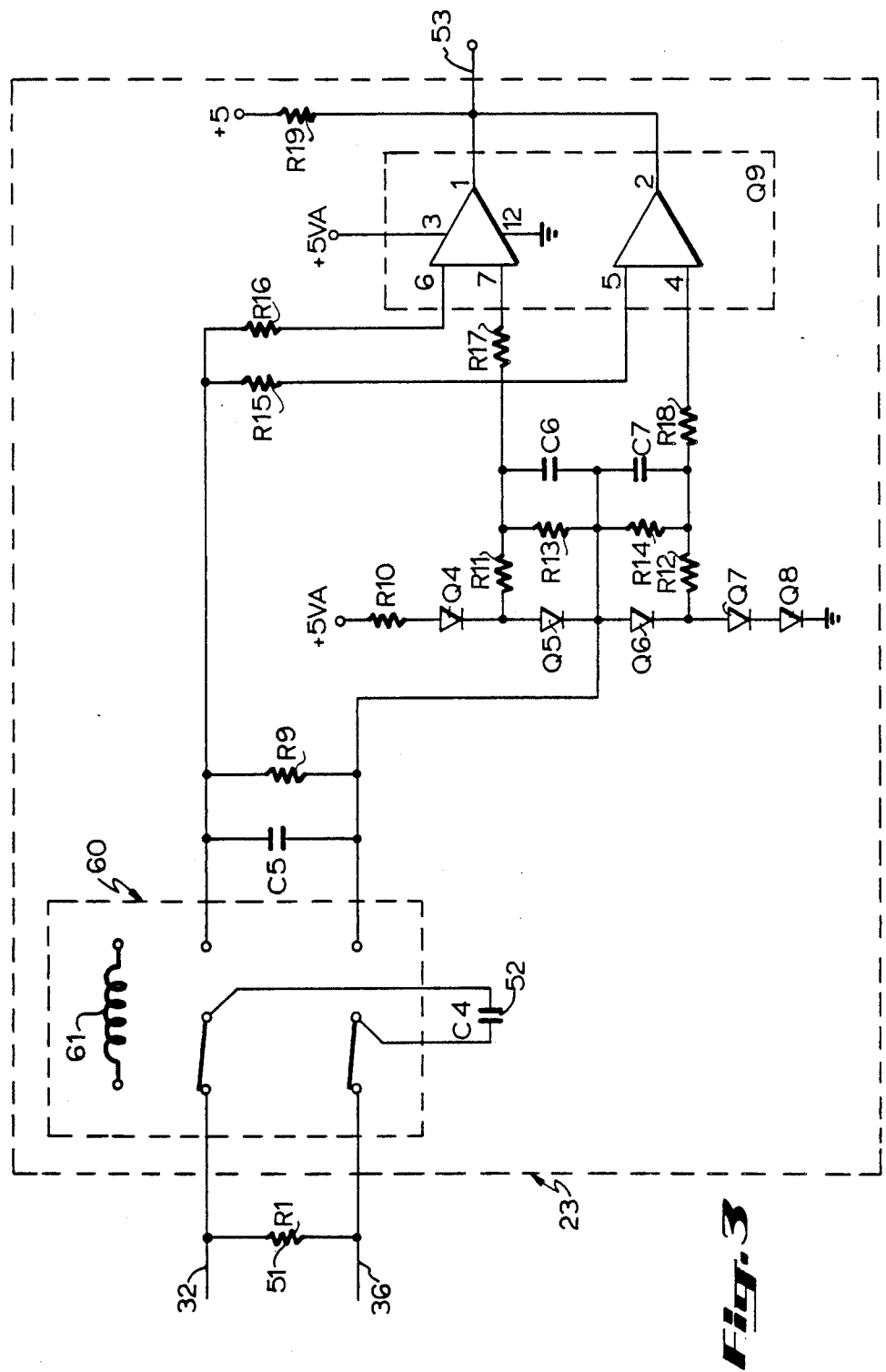
FIG. 3 is a schematic diagram of a polled off-hook detection circuit which may be utilized in the interface of FIG. 2.

FIG. 3 shows an electrical circuit for polled telephone off-hook detection which may be employed in the interface shown in FIG. 2. The detection circuit 23 uses a resistor 51 in electrical parallel with a capacitor 52. A solenoid-actuated DPDT relay 60, in a de-energized state, connects the capacitor 52 across the resistor 51. The resistor 51 and the capacitor 52 are together in electrical series with the RING line 36 and the pole 42 of the switch 24. This can be easily seen by reference to FIGS. 2 and 3. When the telephone 12 is on-hook, the capacitor 52 is discharged through the resistor 51. However, when the telephone 12 goes off-hook, the capacitor 52 becomes electrically charged.

The solenoid 61 of the relay 60 is connected to receive an off-hook inquiry signal from the modem 11. This polling signal by the modem 11 energizes the solenoid 61, causing the relay 60 to connect the capacitor 52 to the remainder of the detection circuit 23. The presence of an electrical charge on the capacitor 52 results in a telephone off-hook signal appearing at the output 53 of the detection circuit 23. The absence of an electrical charge on the capacitor 52 will result in no signal appearing at the output 53 of the detection circuit 23.

The telephone off-hook signal is used to prevent the modem 11 from assuming its off-hook condition so that normal voice communications using the telephone 12 will not be suddenly interrupted by data transmissions by the modem 11. The off-hook signal can accomplish its purpose in at least two ways.

Figure 4:
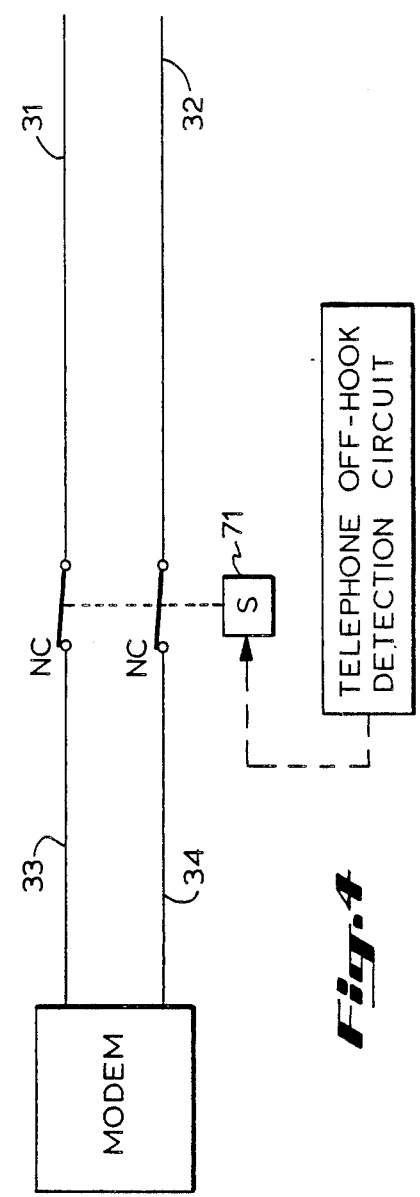
FIG. 4 is a diagram of one circuit for disconnecting the modem from the telephone line while the telephone is in use.

First, a solenoid-actuated switch 70 may be interposed between the TIP and RING lines 31 and 32 of the telephone line 13 and the TIP and RING connections 33 and 34 of the modem 11. Such an arrangement is shown in FIG. 4. The telephone off-hook signal may be used to energize the solenoid 71 of the switch 70, thus disconnecting the modem 11 from the telephone line 13 while the telephone 12 is off-hook.

Alternatively, and preferably, the telephone off-hook signal at the output 53 of the detection circuit 23 will be transmitted to the modem 11 by way of the port 25, as shown in FIG. 2. The modem 11 is typically program-controlled and the program dictates that various steps be followed before the modem 11 goes off-hook to transmit or receive data. The off-hook inquiry, or poll, and the check for the presence of the off-hook signal are easily incorporated into the modem control program so that the telephone off-hook condition will prevent the modem 11 from commencing operations.

The use of the telephone off-hook signal in the modem control program is preferred to the disconnection of the modem 11 for various reasons. First, there may be circumstances in which it is desirable for the modem 11 to interrupt voice communications on the telephone 12. For example, a priority interrupt signal may be transmitted to the modem. Those circumstances can be accommodated if the modem 11 remains connected to the telephone line 13. Otherwise, more complex and unreliable means must be provided. Second, as will be seen below, the telephone handset may be used to monitor data transmission and reception by the modem and the off-hook condition of the telephone should not interrupt the data transfer in that instance.

Returning to FIG. 2, a monitor circuit includes a line current generator 21 and a D.C. isolation and protection circuit 22. The solenoid 49 of the switch 24 is connected to receive a modem off-hook signal from the modem 11. The modem off-hook signal is generated by the modem 11 when it is in its off-hook condition; that is, when the modem 11 is in operation. In the illustrated embodiment, the modem off-hook signal is actually a connection to electrical ground. In that instance, the +12 volt supply which is connected to the solenoid 49 energizes the solenoid 49. The modem off-hook signal (connection to electrical ground) causes the solenoid 49 to become energized, causing the poles 41 and 42 of the switch 24 to switch from their first position, in contact with points 43 and 44, to their second position, in contact with points 45 and 46 of the switch 24. In its second position, the switch 24 disconnects the telephone 12 from the telephone line 13 and connects it, instead, to the monitor circuit.

FIG. 5 is a schematic diagram showing the line current generator 21, the D.C. isolation and protection circuit 22, the switch 24, and the TIP and RING interconnections of the modem 11 and the telephone 12. As shown, the modem TIP and RING lines 33 and 34 and the telephone TIP and RING lines 35 and 36 are connected through the normally closed position of the switch 24. When the modem 11 assumes its off-hook condition, the solenoid 49 becomes energized and the switch 24 assumes its second position. The TIP and RING lines 35 and 36 of the telephone 12 are disconnected from the TIP and RING lines 33 and 34 of the modem 11 and are connected to the line current generator 21 and the D.C. isolation and protection circuit 22.

The operation of the line current generator 21 will be understood by those of skill in the art. The generator provides the internal line current to the telephone 12, allowing it to operate when the modem 11 is off-hook and the telephone 12 is disconnected from the telephone line 13.

The D.C. isolation and protection circuit 22 is interposed between the modem 11 and the telephone 12. An output 80 from the modem 11 is an analog signal which contains both received and transmitted signals. The output from the receive side of the modem direct access arrangement (DAA), or 2-to-4 wire conversion circuit, is combined with the transmit signal within the DAA and the combined signals appear at the output 80. This combined signal, containing both the modem transmitted and received signal, may be monitored simply by listening in on the telephone handset. The telephone microphone is not connected into the circuit and will not interfere with the modem signals and quiet times.

As can easily be seen by reference to FIG. 2, when the modem 11 is in operation, that is, is in its off-hook condition, the telephone 12 is disconnected from the telephone line 13 and its receiver is connected to the monitor circuit so that data transfer can be monitored. Accordingly, the telephone 12 cannot be used to interrupt or interfere with the operation of the modem. Conversely, when the telephone 12 goes off-hook (assuming the modem 11 is not already off-hook), the detection circuit sends a signal to the modem 11 which is then prevented from assuming its off-hook, or operational, state. Of course, as mentioned above, variations in the embodiment may allow the modem 11 to interrupt telephone voice communications under selected circumstances.

The values of electrical components used in the illustrated embodiment are shown on the attachment marked as Appendix A. Variations in those values may result in differences in operation.

Although the present invention has been illustrated in a specific embodiment, it will be understood that many variations in the embodiment may be made without departing from the invention. While other embodiments may achieve certain desired results, they may not include all the advantages of the invention. The invention should be limited only by the scope of the appended claims.

| APPENDIX A | |
|---|---|
| RESISTOR VALUES (In Ohms) | |
| R1 | 6 |
| R2 | 75 |
| R3 | 4.7k |
| R4 | 10k |
| R5 | 75 |
| R6 | 75 |
| R7 | 500 |
| R8 | 500 |
| R9 | 20 Meg |
| R10 | 240 |
| R11 | 1.1k |
| R12 | 1.1k |
| R13 | 56 |
| R14 | 56 |
| R15 | 10k |
| R16 | 10k |
| R17 | 10k |
| R18 | 10k |
| R19 | 10k |
| CAPACITOR VALUES (In µf) | |
| C1 | 33 |
| C2 | .01 |
| C3 | .01 |
| C4 | .33 |
| C5 | .01 |
| C6 | .1 |
| C7 | .1 |
| SEMICONDUCTORS | |
| Q1 | generic; any transistor suitable for switching |
| Q2–Q8 | 1N914 |
| Q9 | TLC374 (14-Pin socket - Pins 8, 9, 10, 11, 13 and 14 not connected) |

What is claimed is:

1. A circuit for interconnecting a modem and a telephone with a telephone line, comprising:
   (a) a switch normally connecting the telephone to the telephone line;
   (b) a telephone off-hook detection circuit; and
   (c) a monitor circuit adapted to receive data signals from the modem, the switch operative to receive a modem off-hook signal when the modem is in an off-hook condition, the switch being responsive to the modem off-hook signal to disconnect the telephone from the telephone line and connect the telephone to the monitor circuit, and the detection circuit adapted to sense an off-hook condition at the telephone when the telephone is connected to the telephone line and operative to prevent the modem from assuming an off-hook condition when the telephone is connected to the telephone line and is in an off-hook condition.

2. The circuit of claim 1, wherein the detection circuit is operative to transmit a telephone off-hook signal to the modem when the telephone is connected to the telephone line and is in an off-hook condition, and wherein the telephone off-hook signal inhibits a modem off-hook signal and prevents the modem from assuming an off-hook condition.

3. A circuit for interconnecting a modem and a telephone with a telephone line, comprising:
   (a) a first port for connection to a telephone line;
   (b) a second port for connection to a telephone;
   (c) a third port for connection to a modem;
   (d) a monitor circuit connected to said third port to receive data signals from said modem;
   (e) a switching relay normally connecting the telephone to the telephone line; and
   (f) a phone off-hook detection circuit connected between the second and third ports,
   wherein the relay is coupled to receive a modem off-hook signal from the modem and is responsive to the modem off-hook signal to disconnect the telephone from the telephone line and connect the telephone to the monitor circuit, and
   wherein the detection circuit monitors the telephone and inhibits operation of the relay when the telephone is connected to the telephone line and is in an off-hook state.

4. The circuit of claim 3, wherein the detection circuit comprises a detector for sensing an off-hook condition at the telephone when the telephone is connected to the telephone line, the detection circuit adapted to transmit a telephone off-hook signal to the modem when the telephone is connected to the telephone line and is in the off-hook condition to prevent the modem from assuming an off-hook condition.

5. A method for coordinating access to a telephone line by a modem and a telephone, comprising the steps of:
   (a) connecting the modem and the telephone to the telephone line;
   (b) disconnecting the telephone from the telephone line when the modem is in an off-hook condition;
   (c) preventing the modem from assuming an off-hook condition when the telephone is connected to the telephone line and is in an off-hook condition;
   wherein the step of preventing includes a step of monitoring the telephone to sense a telephone off-hook condition and a step of transmitting a signal to the modem when a telephone off-hook condition is sensed to inhibit a modem off-hook condition.

6. A method for coordinating access to a telephone line by a modem and a telephone, comprising the steps of:
   (a) connecting the modem and the telephone to the telephone line;
   (b) disconnecting the telephone from the telephone line when the modem is in an off-hook condition;
   (c) connecting the telephone to a data monitoring circuit when the modem is in an off-hook condition; and
   (d) preventing the modem from assuming an off-hook condition when the telephone is connected to the telephone line and is in an off-hook condition
   wherein the step of preventing includes a step of monitoring the telephone to sense a telephone off-hook condition by a telephone off-hook detection circuit.

7. The method of claim 6 wherein the step of preventing further includes a step of transmitting a signal to the modem when a telephone off-hook condition is sensed to inhibit a modem off-hook condition.

* * * * *